(12) United States Patent
Li et al.

(10) Patent No.: US 11,093,744 B1
(45) Date of Patent: Aug. 17, 2021

(54) METHOD AND DEVICE FOR DETERMINING TYPES OF ICE-AND-SNOW COVER

(71) Applicants: ELECTRIC POWER SCIENCE & RESEARCH INSTITUTE OF STATE GRID TIANJIN ELECTRIC POWER, Tianjin (CN); STATE GRID TIANJIN ELECTRIC POWER COMPANY, Tianjin (CN); STATE GRID CORPORATION OF CHINA, Beijing (CN)

(72) Inventors: Longji Li, Tianjin (CN); Qingfeng Wen, Tianjin (CN); Yongfu Wang, Tianjin (CN); Xiaoguang Wang, Tianjin (CN); Yuyan Man, Tianjin (CN); Xiaoguang Xi, Tianjin (CN); Chi Zhang, Tianjin (CN); Wei Fan, Tianjin (CN)

(73) Assignee: ELECTRIC POWER SCIENCE & RESEARCH INSTITUTE OF STATE GRID TIANJIN ELECTRIC POWER COMPANY

( * ) Notice: Subject to any disclaimer, the term of this patent is extended or adjusted under 35 U.S.C. 154(b) by 533 days.

(21) Appl. No.: 16/301,512

(22) PCT Filed: Sep. 21, 2018

(86) PCT No.: PCT/CN2018/107060
§ 371 (c)(1),
(2) Date: Nov. 14, 2018

(87) PCT Pub. No.: WO2019/057174
PCT Pub. Date: Mar. 28, 2019

(30) Foreign Application Priority Data

Sep. 21, 2017 (CN) .......................... 201710855995.3

(51) Int. Cl.
*G06K 9/00* (2006.01)
*G06F 16/535* (2019.01)
(Continued)

(52) U.S. Cl.
CPC ........... *G06K 9/0063* (2013.01); *G06F 9/345* (2013.01); *G06F 16/535* (2019.01); *G06F 16/538* (2019.01); *G06K 2009/00644* (2013.01)

(58) Field of Classification Search
CPC ........ G06K 9/0063; G06K 2009/00644; G06F 9/345; G06F 16/538; G06F 16/535;
(Continued)

(56) References Cited

U.S. PATENT DOCUMENTS 5,838,239 A * 11/1998 Stern .................. B64F 5/20
340/583
6,206,325 B1 * 3/2001 Nunnally ............... B64D 15/00
244/134 E
(Continued)

FOREIGN PATENT DOCUMENTS

CN          102346015 A        2/2012
CN          103033216 A   *    4/2013
(Continued)

OTHER PUBLICATIONS

Patent Cooperation Treaty (PCT), International Search Report and Written Opinion for Application PCT/CN2018/107060 filed Sep. 21, 2018, dated Jan. 4, 2019, International Searching Authority, CN.

*Primary Examiner* — Mahendra R Patel
(74) *Attorney, Agent, or Firm* — McDonald Hopkins LLC

(57) ABSTRACT

Provided is a method for determining types of ice-and-snow cover. The method includes: determining typical RGB component values of typical types of ice-and-snow cover, establishing a one-to-one corresponding relation between the
(Continued)

typical types of ice-and-snow cover and the typical RGB component values, and establishing a database of typical types of ice-and-snow cover; and extracting RGB values of an ice-and-snow covering point from an ice-and-snow cover image of a measurement area, comparing RGB component values of the ice-and-snow covering point with typical RGB component values in the database of typical types of ice-and-snow cover, and determining the type of ice-and-snow cover of the measurement area according to a comparison result.

14 Claims, 4 Drawing Sheets

(51) Int. Cl.
    *G06F 9/345*     (2018.01)
    *G06F 16/538*     (2019.01)

(58) Field of Classification Search
    CPC ... A61B 6/504; A61B 18/1492; A61B 5/7289; A61B 6/5217; G01W 1/14
    USPC .......................................................... 382/103
    See application file for complete search history.

(56) References Cited

U.S. PATENT DOCUMENTS

| | | | | |
|---|---|---|---|---|
| 7,089,115 | B2* | 8/2006 | Chapman | G01S 19/14 342/357.52 |
| 8,796,627 | B2* | 8/2014 | Rockwell | G01N 21/55 250/341.8 |
| 9,057,803 | B2* | 6/2015 | Christian | G01N 11/10 |
| 10,282,821 | B1* | 5/2019 | Warren | G06T 11/00 |
| 10,403,037 | B1* | 9/2019 | Boardman | G06T 7/60 |
| 10,755,357 | B1* | 8/2020 | Davis | G06K 9/00637 |
| 2005/0111692 | A1* | 5/2005 | Boright | G06K 9/0063 382/100 |
| 2005/0114027 | A1* | 5/2005 | Boright | G06K 9/0063 702/3 |
| 2014/0019197 | A1* | 1/2014 | Noyes | G06Q 10/0635 705/7.28 |
| 2015/0120093 | A1* | 4/2015 | Renno | G01N 21/55 701/3 |
| 2015/0367956 | A1* | 12/2015 | Loussides | B64D 45/04 701/11 |
| 2016/0084986 | A1* | 3/2016 | Zach | E04H 9/16 219/502 |
| 2019/0107646 | A1* | 4/2019 | Trustman | G01G 17/04 |
| 2019/0217864 | A1* | 7/2019 | Kusukame | G08G 1/0112 |
| 2020/0017083 | A1* | 1/2020 | Casselgren | B60T 8/172 |

FOREIGN PATENT DOCUMENTS

| | | | |
|---|---|---|---|
| CN | 103400141 A | * | 11/2013 |
| CN | 103528534 A | * | 1/2014 |
| CN | 105629328 A | * | 6/2016 |
| CN | 106568388 | | 4/2017 |
| CN | 106568388 A | * | 4/2017 |
| CN | 106680285 | | 5/2017 |
| CN | 107358259 A | * | 11/2017 |
| CN | 107657090 A | * | 2/2018 |
| CN | 107729397 | | 2/2018 |
| KR | 101626906 | | 6/2016 |
| KR | 101626906 B1 | * | 6/2016 |

\* cited by examiner

METHOD AND DEVICE FOR DETERMINING TYPES OF ICE-AND-SNOW COVER

CROSS-REFERENCE TO RELATED APPLICATIONS

This application claims priority to a Chinese patent application No. 201710855995.3 filed on Sep. 21, 2018, disclosure of which is incorporated herein by reference in its entirety.

This is a National Stage Application, filed under 35 U.S.C. 371, of International Patent Application No. PCT/CN2018/107060, filed on Sep. 21, 2018, which claims priority to Chinese patent application No. 201710855995.3 filed on Sep. 21, 2018, contents of both of which are incorporated herein by reference in their entireties.

TECHNICAL FIELD

The present application relates to a technical field of power transmission lines, in particular, to a method and a device for determining types of ice-and-snow cover.

BACKGROUND

With the accelerated development of China's economy construction, the electricity consumption of all walks of life has increased year by year, and the requirements for power quality and power supply reliability are getting higher and higher. Due to the vast territory, varied topography and geomorphology and frequently occurred micro-meteorological conditions in China, the insulators of power transmission lines may be covered by ice-and-snow, greatly reducing the insulation strength, inducing insulator flashover accidents, and causing large-scale blackouts and great economic losses. In order to avoid the impact of natural weather disasters such as ice-and-snow on the power system, it is urgent to carry out research on relevant phenomena and propose corresponding prevention and control measures.

Currently, researches at home and abroad generally believe that when the type of ice-and-snow covering on the insulators of power transmission lines is glaze, the flashover voltage has a lowest value, and the probability that flashover accidents happen is the biggest. However, under special climatic conditions, flashover accidents caused by the snow cover often happen. Foreign scholars have found that the leakage current development, partial arc distribution and flashover process have obvious differences when snow is in different states. When the moisture content of snow is very low, that is in the case of dry snow, the resistance of snow is large, the leakage current is small, and the Joule heat is insufficient to melt snow, so that the state of the insulators remains unchanged and the flashover voltage is high. When the moisture content of snow is high, that is in the case of wet snow, the snow-water mixture flows along the shed of the insulators, greatly reducing the insulation resistance, causing the electric field distortion of the insulators, generating partial arcs, and finally causing a full-chain flashover. Therefore, the flashover voltage is low and the risk of flashover is high. The flashover accident caused by snow covering on the power transmission line promoted the research on the snow-covered insulator flashover mechanism, which may result in that the bridging among snow-covered sheds, the inner layer melting icing, the snow cover morphology change under special climatic conditions and other factors of the flashover get more attention. The measurement of the state parameters of the snow-covered insulator is the basis of work of anti-snow-covering and anti-flashover on site. Studies have shown that differences in the salt distribution of snow in different states also make the probability of occurrence of snow-covering flashover different.

In snow-ice weather, flashover accidents are prone to happen on the power transmission line insulators. The different types of ice-and-snow covering on the surface of the insulators make the flashover risk various. Since extra-high voltage and ultra-high voltage insulators are set up on a transmission tower whose height above the ground is more than 20 meters, it is difficult for naked eyes to effectively distinguish the types of ice-and-snow cover having different states. Since different types of ice-and-snow cover also bring different risks to the power transmission lines, different countermeasures are required correspondingly. In order to reduce the impact on the normal power supply, the non-contact remote measurement method is very important. Therefore, in order to enable the operation and maintenance personnel to accurately and timely learn about the ice-and-snow covering conditions of the insulators on the power transmission lines and take countermeasures, it is necessary to remotely measure the type of ice-and-snow cover.

SUMMARY

The following is a summary of the subject matter described herein in detail. This summary is not intended to limit the scope of the claims.

The solution proposed by the present application is reasonably deigned, and may accurately and timely get the ice-and-snow covering conditions of the insulators on the power transmission lines.

The present application provides a method for determining types of ice-and-snow cover. The method includes: determining typical RGB component values of typical types of ice-and-snow cover, establishing a one-to-one corresponding relation between the typical types of ice-and-snow cover and the typical RGB component values, and establishing a database of typical types of ice-and-snow cover; and extracting RGB values of an ice-and-snow covering point from an ice-and-snow cover image of a measurement area, comparing RGB component values of the ice-and-snow covering point with typical RGB component values in the database of typical types of ice-and-snow cover, and determining a type of ice-and-snow cover of the measurement area according to a comparison result.

The typical types of ice-and-snow cover includes: glaze, wet snow, dry snow and rime.

In an embodiment, an image of each of typical types of ice-and-snow cover is captured via a color area-array charge-coupled device (CCD) camera, the image of each of typical types of ice-and-snow cover is inputted into a computer after the image of each of typical types of ice-and-snow cover being subjected to a digitalizing processing and processed via Matlab software in the computer to obtain typical RGB primary color component values of the typical types of ice-and-snow cover, a one-to-one corresponding relation between the typical types of ice-and-snow cover and the typical RGB component values is established, and the database of typical types of ice-and-snow cover database is established.

In an embodiment, an image of the measurement area is captured via a color area-array charge-coupled device (CCD) camera to obtain the ice-and-snow cover image of the measurement area, where the measurement area is an ice-and-snow covering point of an insulator in a power transmission line; the ice-and-snow cover image of the measurement area is inputted into a computer and processed via Matlab software in the computer to obtain average RGB values of the ice-and-snow cover image, and the average RGB values are used as RGB component values of the ice-and-snow cover image of the measurement area; and the RGB component values of the ice-and-snow covering point of the measurement area are compared with the typical RGB component values in the database of typical types of ice-and-snow cover, and the type of ice-and-snow cover of the measurement area is determined according to a comparison result.

In an embodiment, the type of ice-and-snow cover of the measurement area is determined according to the following correspondence relations: determination intervals of R, G and B component values corresponding to a glaze type respectively are 130-170, 130-170 and 120-160; determination intervals of R, G and B component values corresponding to a rime type respectively are 230-255, 230-255 and 220-255; determination intervals of R, G and B component values corresponding to a wet snow type respectively are 170-210, 170-210 and 160-200; and determination intervals of R, G and B component values corresponding to a dry snow type respectively are 210-230, 210-230 and 200-200.

In the present application, an ice-and-snow cover image of an insulator in a power transmission line is captured in site, RGB values of an ice-and-snow covering point is extracted and compared with a previously established database of typical types of ice-and-snow cover so as to determine the types of ice-and-snow cover. In such a way, the type of ice-and-snow cover of the insulator far from the ground which is running is remotely measured and determined, thereby quickly identifying the type of ice-and-snow cover of the insulator on the power transmission line, including the ice-and-snow covering state, and providing an important reference for the work of anti-snow-covering and anti-flashover on the power transmission line.

The present application forms a complete and standard measurement process and completes the research of the type of ice-and-snow cover determination. The application may guide the measurement of type of ice-and-snow cover under different snow-ice weather in different regions, and enable operation and maintenance personnel to accurately and timely learn about the ice-and-snow covering conditions of the insulators on the power transmission lines.

An embodiment of the present application provides a device for determining types of ice-and-snow cover. The device includes an establishing module for a database of typical types of ice-and-snow cover and a determining module for a type of ice-and-snow cover of a measurement area.

The establishing module for a database of typical types of ice-and-snow cover is configured to determine typical RGB component values of the typical types of ice-and-snow cover, establish a one-to-one corresponding relation between the typical types of ice-and-snow cover and the typical RGB component values, and establish a database of typical types of ice-and-snow cover. The determining module for types of ice-and-snow cover of a measurement area is configured to extract RGB values of an ice-and-snow covering point from an ice-and-snow cover image of the measurement area, compare RGB component values of the ice-and-snow covering point with typical RGB component values of the types of ice-and-snow cover, and determine the type of ice-and-snow cover of the measurement area according to a comparison result.

In an embodiment, the establishing module for a database of typical types of ice-and-snow cover includes: an obtaining unit for an image of typical types of ice-and-snow cover, a determining unit for typical RGB component values and an establishing unit for a database of typical types of ice-and-snow cover.

The obtaining unit for an image of typical types of ice-and-snow cover is configured to capture an image of each of the typical types of ice-and-snow cover via a color area-array charge-coupled device (CCD) camera.

The determining unit for typical RGB component values is configured to digitalize the image of each of the typical types of ice-and-snow cover and input the digitalized image of each of the typical types of ice-and-snow cover into a computer, and process the digitalized image of each of typical types of ice-and-snow cover so as to obtain the typical RGB component values of the typical types of ice-and-snow cover.

The establishing unit for a database of typical types of ice-and-snow cover is configured to establish the one-to-one corresponding relation between the typical types of ice-and-snow cover and the typical RGB component values, and establish the database of typical types of ice-and-snow cover.

In an embodiment, the determining module for types of ice-and-snow cover of a measurement area includes: an obtaining unit for an ice-and-snow cover image, an obtaining unit for RGB component values of an ice-and-snow cover image and a determining unit for types of ice-and-snow cover.

The obtaining unit for an ice-and-snow cover image is configured to capture an image of the measurement area via a color area-array charge-coupled device (CCD) camera to obtain the ice-and-snow cover image of the measurement area, where the measurement area is an ice-and-snow covering point of an insulator in a power transmission line.

The obtaining unit for RGB component values of an ice-and-snow cover image is configured to input the ice-and-snow covering image of the measurement area into a computer, process the ice-and-snow cover image via Matlab software in the computer to obtain average RGB values of the ice-and-snow cover image, and use the average RGB values as RGB component values of the ice-and-snow cover image of the measurement area.

The determining unit for types of ice-and-snow cover is configured to compare the RGB component values of the ice-and-snow covering point with the typical RGB component values to obtain the type of ice-and-snow cover of the measurement area.

In an embodiment, the type of ice-and-snow cover of the measurement area is determined according to the following correspondence relations: determination intervals of R, G and B component values corresponding to a glaze type respectively are 130-170, 130-170 and 120-160;

determination intervals of R, G and B component values corresponding to a rime type respectively are 230-255, 230-255 and 220-255; determination intervals of R, G and B component values corresponding to a wet snow type respectively are 170-210, 170-210 and 160-200; and determination intervals of R, G and B component values corresponding to a dry snow type respectively are 210-230, 210-230 and 200-200.

An embodiment of the present application further provides a computer-readable storage medium, which is configured to store computer programs for implementing the method for determining an icing and snowing covering type described above when the programs are executed by a processor.

An embodiment of the present application provides a terminal device, including a memory, a processor, and computer programs stored in the memory and executable on the processor, where, when executing the computer programs, the processor implements the method for determining an icing and snowing covering type described above.

Other aspects can be understood after the accompanying drawings and detailed description are read and understood.

DETAILED DESCRIPTION

A detailed description of embodiments of the present application will be given below with reference to the drawings.

Figure 1:
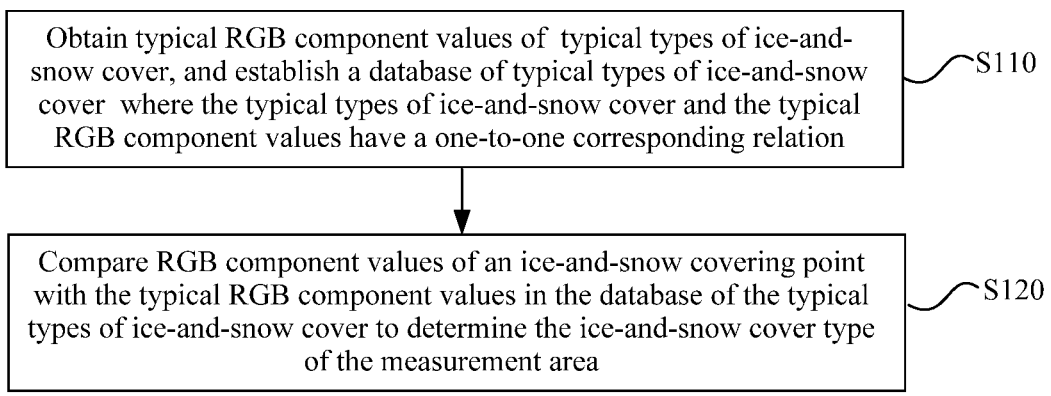
FIG. 1 is a flowchart of a method for determining types of ice-and-snow cover according to the present application.

The present application provides a method for determining types of ice-and-snow cover. As shown in FIG. 1, the method includes step S110 and step S120.

In step S110, typical RGB component values of typical types of ice-and-snow cover is determined, a one-to-one corresponding relation between the typical types of ice-and-snow cover and typical RGB component values is established, and a database of typical types of ice-and-snow cover is established.

The typical types of ice-and-snow cover includes: glaze, hard rime, soft rime, wet snow, dry snow and frost. An image of the position of the ice-and-snow cover is captured via a color area-array charge-coupled device (CCD) camera. The captured image is digitized via an image capture card and inputted into a computer. An image area to be detected is processed via mathematical software, Matlab, and the average RGB values of the image area are read and used as RGB component values of the typical types of ice-and-snow cover.

In an embodiment, an image of each of typical types of ice-and-snow cover is captured via the color-area CCD camera; the image of typical types of ice-and-snow cover image is inputted into a computer after the image of typical types of ice-and-snow cover image being subjected to a digital processing; and the image is processed via Matlab software to obtain RGB primary color component values of the typical type of ice-and-snow cover.

A one-to-one corresponding relation between the typical types of ice-and-snow cover and the typical RGB component values is established, and the database of typical types of ice-and-snow cover is established.

Since images in nature may be indicated by a function based on position coordinates, this method mainly considers adopting a plane image. The points on the plane include two coordinate values, and the function is expressed as follows:

$$f(x,y)=\{f_{red}(x,y), f_{green}(x,y), f_{blue}(x,y)\}.$$

In the function, $f(x,y)$ indicates colors of an objective object in a position whose space coordinates are $(x,y)$, and $f_{red}(x,y)$, $f_{green}(x,y)$ and $f_{blue}(x,y)$ are respectively component values of three primary colors (i.e., red, green and blue) in this position. They are all space continuous functions, that is, each point in the continuous space has an exact corresponding R, G and B value.

Generally, for the same type of ice-and-snow cover, the difference between the component values of the three primary colors of RGB is relatively small. For different types of ice-and-snow cover, the component values of RGB are illustrated in ascending order: glaze (R: 151.0711, G: 144.7861, B: 139.2334), wet snow (R: 182.5343, G: 190.8756, B: 187.8893), dry snow (R: 208.0202, G: 213.2551, B: 211.3892), rime (R: 237.0573, G: 238.8498, B: 236.4083), as shown in FIGS. 3a, 3b, 3c and 3d.

Figure 2:
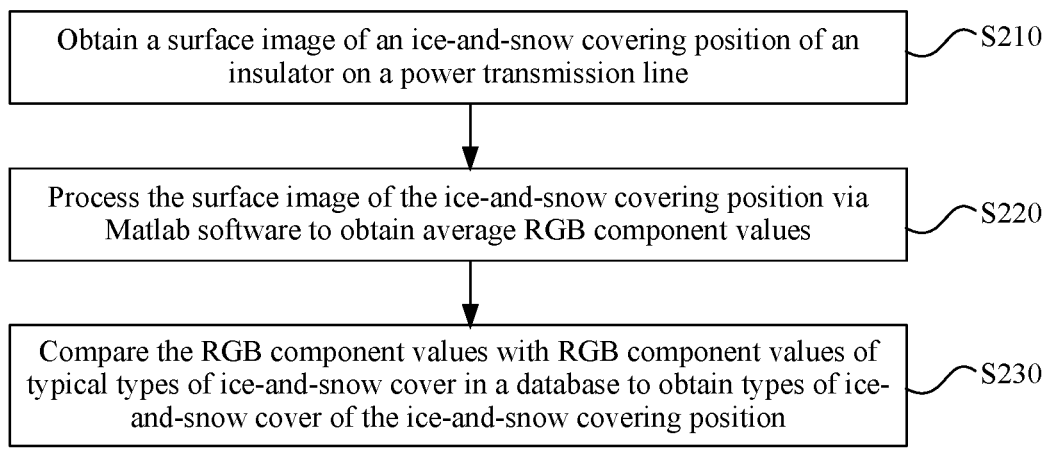
FIG. 2 is a flowchart of another method for determining types of ice-and-snow cover according to the present application.
Figure 3A:
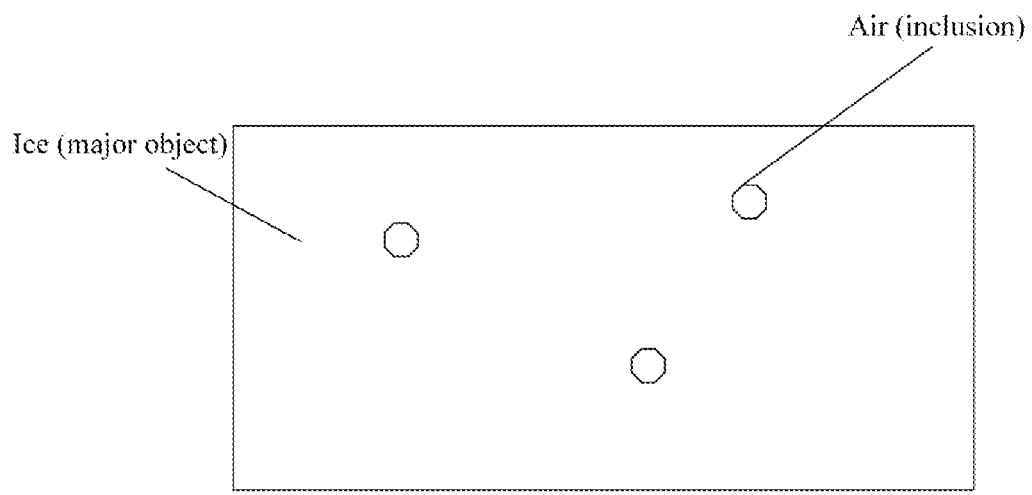
FIG. 3a is a captured image of a type of ice-and-snow cover as glaze.
Figure 3B:
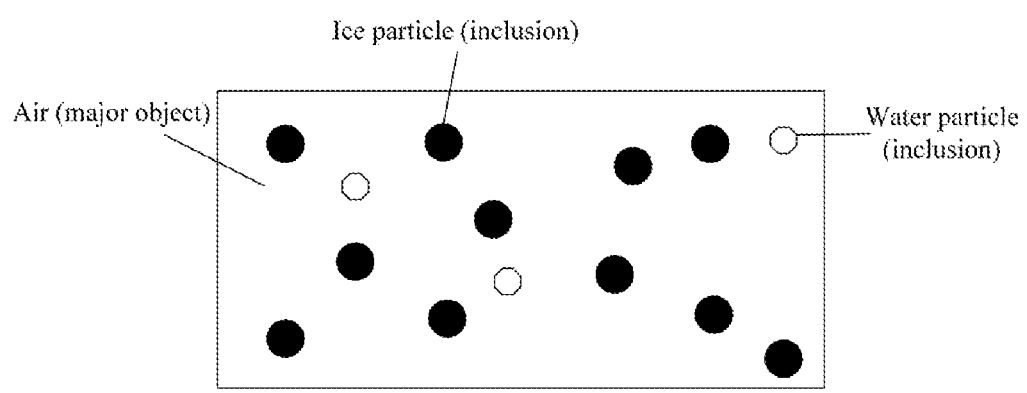
FIG. 3b is a captured image of a type of ice-and-snow cover as rime.
Figure 3C:
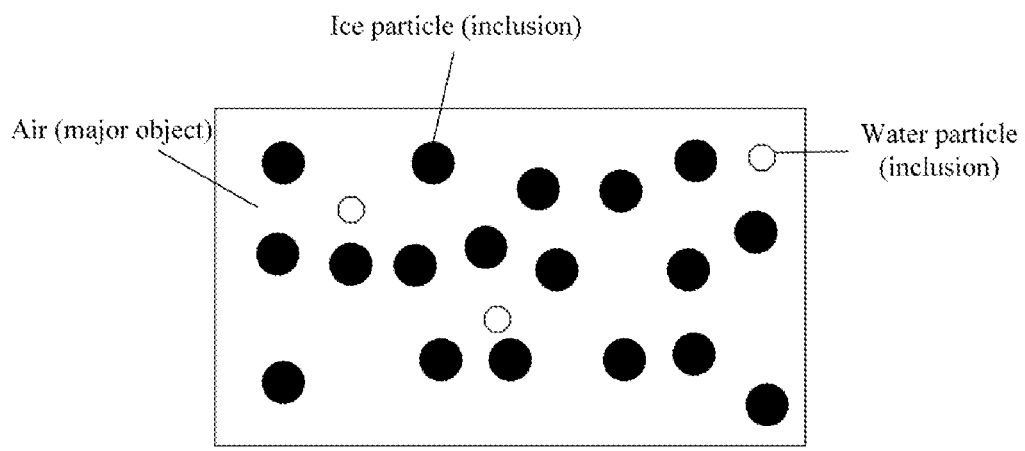
FIG. 3c is a captured image of a type of ice-and-snow cover as dry snow.
Figure 3D:
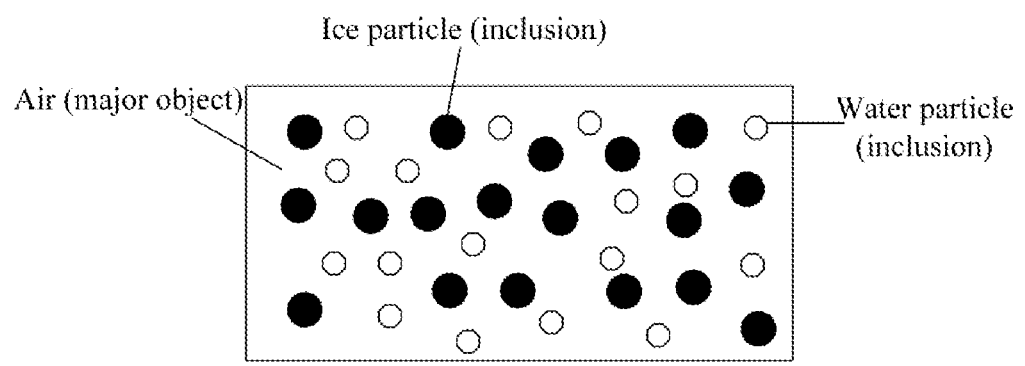
FIG. 3d is a captured image of a type of ice-and-snow cover as wet snow.

In step S120, an ice-and-snow cover image of an insulator in a power transmission line is captured in site, and RGB values of an ice-and-snow covering point is extracted, RGB component values of the ice-and-snow covering point are compared with typical RGB component values in the database so as to determine the types of ice-and-snow cover, as shown in FIG. 2 which includes steps S210, S220 and S230.

In step S210, during the field measurement, a color area CCD camera focuses on and shoots an ice-and-snow covering point of an insulator on a power transmission line to obtain an ice-and-snow cover image.

In step S220, the obtained image is inputted into a computer via an image capture card and processed via Matlab software, average RGB values of the ice-and-snow covering point are read, and RGB component values of the ice-and-snow covering point are obtained.

In step S230, RGB values of the measurement point is compared with typical RGB values of the typical type of ice-and-snow cover in the database to obtain the type of ice-and-snow cover of the measurement point.

After comparison, the determination intervals of the actually obtained types of ice-and-snow cover are as follows:

TABLE 1

| Glaze | | | |
|---|---|---|---|
| | R | G | B |
| 1 | 151.0711 | 144.7861 | 139.2334 |
| 2 | 148.8659 | 146.1821 | 134.2895 |
| 3 | 161.8920 | 156.0217 | 150.6631 |
| 4 | 138.4839 | 132.8842 | 125.9435 |
| 5 | 142.3961 | 138.8367 | 132.4250 |

Therefore, the recommended intervals of R, G and B component values corresponding to a glaze type are R (130, 170), G (130, 170) and B (120, 160).

TABLE 2

| Rime | | | |
|---|---|---|---|
| | R | G | B |
| 1 | 237.0573 | 238.8498 | 236.4083 |
| 2 | 234.9599 | 217.1371 | 226.1442 |
| 3 | 242.5071 | 230.1654 | 225.1535 |
| 4 | 234.9211 | 236.7628 | 227.9973 |
| 5 | 231.7212 | 233.1803 | 225.3458 |

Therefore, the recommended intervals of R, G and B component values corresponding to a rime type are R (230, 255), G (230, 255) and B (220, 255).

TABLE 3

Wet snow

|   | R | G | B |
|---|---|---|---|
| 1 | 181.0054 | 181.1460 | 177.6165 |
| 2 | 182.5343 | 190.8756 | 187.8893 |
| 3 | 199.0916 | 206.3209 | 207.7635 |
| 4 | 199.8093 | 201.5479 | 190.6320 |
| 5 | 180.7114 | 182.8021 | 175.5335 |

Therefore, the recommended intervals of R, G and B component values corresponding to a wet snow type are R (170, 210), G (170, 210) and B (160, 200).

TABLE 4

Dry snow

|   | R | G | B |
|---|---|---|---|
| 1 | 208.0202 | 213.2551 | 211.3892 |
| 2 | 211.2448 | 213.3740 | 201.9451 |
| 3 | 216.0317 | 213.6972 | 200.4467 |
| 4 | 217.4468 | 219.2718 | 209.8451 |
| 5 | 228.4509 | 227.2686 | 215.8043 |

Therefore, the recommended intervals of R, G and B component values corresponding to a dry snow type are R (210, 230), G (210, 230) and B (200, 220).

What is claimed is:

1. A method for determining types of ice-and-snow cover, comprising:
    determining typical RGB component values of typical types of ice-and-snow cover, establishing a one-to-one corresponding relation between the typical types of ice-and-snow cover and the typical RGB component values, and establishing a data base of typical types of ice-and-snow cover; and
    extracting RGB component values of an ice-and-snow covering point from an ice-and-snow cover image of a measurement area, comparing the RGB component values of the ice-and-snow covering point with the typical RGB component values in the database of typical types of ice-and-snow cover, and determining a type of ice-and-snow cover of the measurement area according to a comparison result.

2. The method of claim 1, wherein the typical types of ice-and-snow cover comprise: glaze, wet snow, dry snow and rime.

3. The method of claim 1, wherein the determining typical RGB component values of typical types of ice-and-snow cover, establishing a one-to-one corresponding relation between the typical types of ice-and-snow cover and the typical RGB component values, and establishing a database of typical types of ice-and-snow cover comprises:
    capturing an image of each of typical types of ice-and-snow cover via a color area-array charge-coupled device (CCD) camera;
    inputting the image of the each of typical types of ice-and-snow cover into a computer after the image of the each of typical types of ice-and-snow cover is subjected to a digitalizing processing, and processing the image of the each of typical types of ice-and-snow cover via Matlab software in the computer to obtain typical RGB component values of the each of typical types of ice-and-snow cover; and
    establishing the one-to-one corresponding relation between the typical types of ice-and-snow cover and the typical RGB component values, and establishing the database of typical types of ice-and-snow cover.

4. The method of claim 1, wherein the extracting RGB values of an ice-and-snow covering point from an ice-and-snow cover image of a measurement area, comparing RGB component values of the ice-and-snow covering point with typical RGB component values in the database of typical types of ice-and-snow cover, and determining a type of ice-and-snow cover of the measurement area according to a comparison result comprises:
    capturing an image of the measurement area via a color area-array charge-coupled device (CCD) camera to obtain an ice-and-snow cover image of the measurement area, wherein the measurement area is the ice-and-snow covering point of an insulator in a power transmission line;
    inputting the ice-and-snow cover image of the measurement area into a computer, processing the ice-and-snow cover image via Matlab software in the computer to obtain average RGB values of the ice-and-snow cover image, and using the average RGB values as RGB component values of the ice-and-snow covering image of the measurement area; and
    comparing the RGB component values of the ice-and-snow covering image of the measurement area with the typical RGB component values in the data of typical types of ice-and-snow cover, and determining a type of ice-and-snow cover of the measurement area according to the comparison result.

5. The method of claim 4, wherein the type of ice-and-snow cover of the measurement area is determined according to the following correspondence relations:
    determination intervals of R, G and B component values corresponding to a glaze type respectively are 130-170, 130-170 and 120-160;
    determination intervals of R, G and B component values corresponding to a rime type respectively are 230-255, 230-255 and 220-255;
    determination intervals of R, G and B component values corresponding to a wet snow type respectively are 170-210, 170-210 and 160-200; and
    determination intervals of R, G and B component values corresponding to a dry snow type respectively are 210-230, 210-230 and 200-200.

6. A device for determining types of ice-and-snow cover, comprising:
    an establishing module for a database of typical types of ice-and-snow cover, which is configured to determine typical RGB component values of typical types of ice-and-snow cover, establish a one-to-one corresponding relation between the typical types of ice-and-snow cover and the typical RGB component values, and establish the database of typical types of ice-and-snow cover; and
    a determination module for a type of ice-and-snow cover of a measurement area, which is configured to extract RGB values of an ice-and-snow covering point from an ice-and-snow cover image of the measurement area, compare RGB component values of the ice-and-snow covering point with typical RGB component values of the types of ice-and-snow cover, and determine the type of ice-and-snow cover of the measurement area according to a comparison result.

7. The device of claim 6, wherein the establishing module for a database of typical types of ice-and-snow cover comprises: an obtaining unit for an image of a typical type of ice-and-snow cover, a determination unit for typical RGB component values and an establishing unit for a database of typical types of ice-and-snow cover, wherein the obtaining unit for an image of a typical type of ice-and-snow cover is configured to capture an image of each of typical types of ice-and-snow cover via a color area-array charge-coupled device (CCD) camera;

the determination unit for typical RGB component values is configured to digitalize the image of the each of typical types of ice-and-snow cover and input the digitalized image of the each of typical types of ice-and-snow cover into a computer, and process the digitalized image of the each of typical types of ice-and-snow cover so as to obtain typical RGB component values of the typical types of ice-and-snow cover; and the establishing unit for a database of typical types of ice-and-snow cover is configured to establish a one-to-one corresponding relation between the typical types of ice-and-snow cover and the typical RGB component values, and establish the database of typical types of ice-and-snow cover.

8. The device of claim 6, wherein the determination module for a type of ice-and-snow cover of a measurement area comprises: an obtaining unit for an ice-and-snow cover image, an obtaining unit for RGB component values of the ice-and-snow cover image and a determination unit for a type of ice-and-snow cover, wherein the obtaining unit for an ice-and-snow cover image is configured to capture the measurement area via a color area-array charge-coupled device (CCD) camera to obtain the ice-and-snow cover image of the measurement area, wherein the measurement area is an ice-and-snow covering point of an insulator in a power transmission line;

the obtaining unit for RGB component values of the ice-and-snow cover image is configured to input the ice-and-snow cover image of the measurement area into a computer, process the ice-and-snow cover image via Matlab software in the computer to obtain average RGB values of the ice-and-snow cover image, and use the average RGB values as RGB component values of the ice-and-snow cover image of the measurement area; and the determination unit for a type of ice-and-snow cover is configured to compare the RGB component values of the ice-and-snow cover image with the typical RGB component values to obtain the type of ice-and-snow cover of the measurement area.

9. The apparatus of claim 6, wherein the type of ice-and-snow cover of the measurement area is determined according to the following correspondence relations:

determination intervals of R, G and B component values corresponding to a glaze type respectively are 130-170, 130-170 and 120-160;

determination intervals of R, G and B component values corresponding to a rime type respectively are 230-255, 230-255 and 220-255;

determination intervals of R, G and B component values corresponding to a wet snow type respectively are 170-210, 170-210 and 160-200; and determination intervals of R, G and B component values corresponding to a dry snow type respectively are 210-230, 210-230 and 200-200.

10. A non-transitory computer-readable storage medium, which is configured to store computer programs for implementing the method for determining types of ice-and-snow cover according to claim 1 when the programs are executed by a processor.

11. A terminal device, comprising a memory, a processor, and computer programs stored in the memory and executable on the processor, wherein, when executing the computer programs, the processor implements the method for determining types of ice-and-snow cover according to claim 1.

12. The method of claim 2, wherein the determining typical RGB component values of typical types of ice-and-snow cover, establishing a one-to-one corresponding relation between the typical types of ice-and-snow cover and the typical RGB component values, and establishing a database of typical types of ice-and-snow cover comprises:

capturing an image of each of typical types of ice-and-snow cover via a color area-array charge-coupled device (CCD) camera;

inputting the image of the each of typical types of ice-and-snow cover into a computer after the image of the each of typical types of ice-and-snow cover is subjected to a digitalizing processing, and processing the image of the each of typical types of ice-and-snow cover via Matlab software in the computer to obtain typical RGB component values of the each of typical types of ice-and-snow cover; and establishing the one-to-one corresponding relation between the typical types of ice-and-snow cover and the typical RGB component values, and establishing the database of typical types of ice-and-snow cover.

13. The method of claim 2, wherein the extracting RGB values of an ice-and-snow covering point from an ice-and-snow cover image of a measurement area, comparing RGB component values of the ice-and-snow covering point with typical RGB component values in the database of typical types of ice-and-snow cover, and determining a type of ice-and-snow cover of the measurement area according to a comparison result comprises:

capturing an image of the measurement area via a color area-array charge-coupled device (CCD) camera to obtain an ice-and-snow cover image of the measurement area, wherein the measurement area is the ice-and-snow covering point of an insulator in a power transmission line;

inputting the ice-and-snow cover image of the measurement area into a computer, processing the ice-and-snow cover image via Matlab software in the computer to obtain average RGB values of the ice-and-snow cover image, and using the average RGB values as RGB component values of the ice-and-snow covering image of the measurement area; and comparing the RGB component values of the ice-and-snow covering image of the measurement area with the typical RGB component values in the data of typical types of ice-and-snow cover, and determining a type of ice-and-snow cover of the measurement area according to the comparison result.

14. The method of claim 13, wherein the type of ice-and-snow cover of the measurement area is determined according to the following correspondence relations:

determination intervals of R, G and B component values corresponding to a glaze type respectively are 130-170, 130-170 and 120-160;

determination intervals of R, G and B component values corresponding to a rime type respectively are 230-255, 230-255 and 220-255;

determination intervals of R, G and B component values corresponding to a wet snow type respectively are 170-210, 170-210 and 160-200; and determination intervals of R, G and B component values corresponding to a dry snow type respectively are 210-230, 210-230 and 200-200.

* * * * *